United States Patent
Lv et al.

(10) Patent No.: US 12,054,633 B2
(45) Date of Patent: Aug. 6, 2024

(54) PREPARATION METHOD FOR SALT-SPRAY-RESISTANT POLYASPARTATE, SALT-SPRAY-RESISTANT POLYASPARTATE, AND COATING

(71) Applicant: SHENZHEN FEIYANG PROTECH CORP., LTD, Guangdong (CN)

(72) Inventors: Wenzhang Lv, Guangdong (CN); Shankai Luo, Guangdong (CN); Poli Zhao, Guangdong (CN); Shuisheng Cai, Guangdong (CN); Xiaoyong Qiu, Guangdong (CN); Longhui Zhu, Guangdong (CN); Feiyun He, Guangdong (CN)

(73) Assignee: SHENZHEN FEIYANG PROTECH CORP., LTD, Guangdong (CN)

( * ) Notice: Subject to any disclaimer, the term of this patent is extended or adjusted under 35 U.S.C. 154(b) by 0 days.

(21) Appl. No.: 18/397,509

(22) Filed: Dec. 27, 2023

(65) Prior Publication Data

US 2024/0141201 A1 May 2, 2024

Related U.S. Application Data

(63) Continuation of application No. PCT/CN2023/079616, filed on Mar. 3, 2023.

(30) Foreign Application Priority Data

Apr. 22, 2022 (CN) .......................... 202210428983.3

(51) Int. Cl.
C09D 175/02 (2006.01)
C08G 18/38 (2006.01)
C09D 5/08 (2006.01)

(52) U.S. Cl.
CPC ....... *C09D 175/02* (2013.01); *C08G 18/3821* (2013.01); *C09D 5/08* (2013.01)

(58) Field of Classification Search
CPC .................. C08G 73/00; C08G 18/3821
See application file for complete search history.

(56) References Cited

U.S. PATENT DOCUMENTS

2020/0239702 A1  7/2020  Hart
2021/0032407 A1* 2/2021 Johnston ............ C08G 18/3821

FOREIGN PATENT DOCUMENTS

| CN | 110527414 A |   | 12/2019 |
|---|---|---|---|
| CN | 111793420 A |   | 10/2020 |
| CN | 112625236 A |   | 4/2021 |
| CN | 114716671 A | * | 7/2022 |
| CN | 114716671 A |   | 7/2022 |

OTHER PUBLICATIONS

CN114716671 English machine translation, prepared Feb. 26, 2024. (Year: 2024).*
International Search Report of Corresponding Application No. PCT/CN2023/079616; May 23, 2023; 4 Pgs.
National standards of the People's Republic of China; "Determination of drying time of paint film and putty film"; GB 1728-79(89); 4 Pgs.
National standards of the People's Republic of China; "Determination of neutral salt spray resistance of color paint and varnish"; 17 Pgs.
National standards of the People's Republic of China; "Paint and varnish pencil method to determine the hardness of paint film"; 13 Pgs.
National standards of the People's Republic of China; "Grid test of color paint and varnish paint film"; 15 Pgs.
National standard of the People's Republic of China; "The applicable period of the multi-component varnish paint and varnish system; Determine the sample preparation and state regulation and test guidlines"; 13 Pgs.

* cited by examiner

*Primary Examiner* — Christopher M Rodd
(74) *Attorney, Agent, or Firm* — Cooper Legal Group, LLC

(57) ABSTRACT

A preparation method for a salt-spray-resistant polyaspartic acid ester includes mixing polyaspartic acid ester, cardanol resin and a catalyst together for transesterification reaction, and controlling a temperature at 100-130° C. and a relative vacuum degree at −0.095 MPa--0.1 MPa, and stirring for reaction for 2-5 h to obtain the salt-spray-resistant polyaspartic acid ester; in particular, a molar ratio of the polyaspartic acid ester to the cardanol resin to the catalyst is polyaspartic acid ester:the cardanol resin:the catalyst=1:0.1-0.3:0.001-0.003, and the catalyst is tetraisopropyl titanate or dibutyltin oxide.

7 Claims, No Drawings

PREPARATION METHOD FOR SALT-SPRAY-RESISTANT POLYASPARTATE, SALT-SPRAY-RESISTANT POLYASPARTATE, AND COATING

CROSS-REFERENCE TO RELATED APPLICATION

This application is a continuation of PCT application serial no. PCT/CN2023/079616, filed on Mar. 3, 2023, which claims the priority and benefit of Chinese patent application serial no. 202210428983.3, filed on Apr. 22, 2022. The entireties of PCT application serial no. PCT/CN2023/079616 and Chinese patent application serial no. 202210428983.3 are hereby incorporated by reference herein and made a part of this specification.

TECHNICAL FIELD

The present application relates to the technical field of polyaspartic acid ester, and in particular, relates to a preparation method for salt-spray-resistant polyaspartic acid ester, salt-spray-resistant polyaspartic acid ester, and coating.

BACKGROUND ART

Polyaspartic acid ester is prepared by performing Michael reaction between the aliphatic or cyclic aliphatic diamine or polyamine and maleic acid ester or fumaric acid ester. Polyaspartic acid ester is commonly applied in coating filed. The polyaspartic acid ester coatings are prepared by reacting polyaspartic acid ester with isocyanate. The reaction speed between the polyaspartic acid ester and isocyanate is slower compared with general amino resin. The reason is that, the spatial hindrance and induced effect of maleic acid ester or fumaric acid ester can effectively delay the reaction speed between the polyaspartic acid ester and the isocyanate. Therefore, the prepared polyaspartic acid ester coatings have longer construction period, and its construction method can be spraying coating, rolling coating, scraping coating, etc., and there is no need for professional and expensive construction equipment.

The reactivity of secondary amino group of the polyaspartic acid ester is higher than that of the hydroxyl of the polyurethane, and the reaction speed is much faster, which can realize a quick curing, without baking or heating. In addition, polyaspartic acid ester has a small molecular weight and a low viscosity, thereby allowing for construction without solvents. Therefore, the polyaspartic acid ester belongs to an environmental friendly coating with high solid content, which can be widely applied in fields such as waterproof, flooring, and anti-corrosion.

However, since polyaspartic acid ester has a small molecular weight and a high content of ester bonds in the molecules, the polyaspartic acid ester coatings prepared by reacting the polyaspartic acid ester with the isocyanate have poor hydrophobicity and water resistance, resulting in poor salt spray resistance of the coatings. Since the salt spray is supersaturated water spray, the paint film is easy to be permeated and corroded by salt spray due to poor hydrophobicity and water resistance of polyaspartic acid ester. Therefore, polyaspartic acid ester coatings are difficult to be applied in heavy anti-corrosion fields such as construction machinery anti-corrosion, ship anti-corrosion, etc. due to poor salt spray resistance of the polyaspartic acid ester coatings.

SUMMARY

In order to improve the salt spray resistance of polyaspartic acid ester, the present application provides a preparation method for salt-spray-resistant polyaspartic acid ester, salt-spray-resistant polyaspartic acid ester, and coating.

In a first aspect, the present application provides a preparation method for salt-spray-resistant polyaspartic acid ester, adopting the following technical solution:

a preparation method for salt-spray-resistant polyaspartic acid ester includes the following steps:

mixing polyaspartic acid ester, cardanol resin and a catalyst together for transesterification reaction, and controlling a temperature at 100-130° C. and a relative vacuum degree at −0.095 MPa−−0.1 MPa, and stirring for reaction for 2-5 h to obtain the salt-spray-resistant polyaspartic acid ester;

in particular, a molar ratio of the polyaspartic acid ester to the cardanol resin to the catalyst is polyaspartic acid ester:the cardanol resin:the catalyst=1:0.1-0.3:0.001-0.003, and the catalyst is tetraisopropyl titanate or dibutyltin oxide; and a structural formula of the cardanol resin is

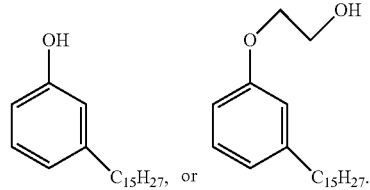

In the above technical solution, the cardanol resin is a natural phenolic material obtained from cashew nuts shell oils through distillation extraction, whose molecule includes an aromatic ring, hydroxyl group, and a long aliphatic side chain, in which the aromatic ring can provide good chemical resistance and rigidity, the hydroxyl group can provide reactivity, so that the cardanol resin can conduct esterification or transesterification reaction, and the aliphatic side chain can provide good water resistance, toughness, low viscosity and long construction period. Therefore, modifying the polyaspartic acid ester by cardanol resin can improve the water resistance and the salt spray resistance of the polyaspartic acid ester, so that the polyaspartic acid ester has good corrosion resistance.

In addition, the prepared polyaspartic acid ester has low viscosity due to low viscosity of cardanol resin, longer construction period and can be constructed without solvent, and is green and environmental friendly.

The catalyst mainly plays a role in ester exchange, the cardanol resin and polyaspartic acid ester are conducted a transesterification reaction, and the cardanol resin is connected the polyaspartic acid ester and a monohydric alcohol is replaced at the same time. Tetraisopropyl titanate is easy to absorb water to generate titanium oxide, thereby facilitating improving the corrosion resistance of the coating. Dibutyltin oxide has thermal stability and hydrolysis resistance, and the obtained products are neutral and have no corrosive effect. In addition, the two catalysts do not need to be separated after the reaction is completed, which do not affect the product quality, so as to save process costs.

It can be known from experimental verification, when the molar ratio of cardanol resin to polyaspartic acid ester is less than 0.1:1, the improvement of the salt spray resistance of the prepared polyaspartic acid ester coating is not significant. As the additive amount of cardanol resin increases, the salt spray resistance of the prepared polyaspartic acid ester is improved, however, the viscosity of the resin is also increased, and more solvent need to be added in the application. When the molar ratio of cardanol resin to polyaspartic acid ester is greater than 0.3:1, the hardness of the prepared polyaspartic acid ester coating is reduced, and the paint films are easy to be damaged. The crosslinking density of the polyaspartic acid ester and the curing agent is reduced during continuous application due to the large amount of the additive amount of cardanol resin and too long branched chains, thereby causing the decrease of the salt spray resistance of the coating.

In an embodiment, the polyaspartic acid ester is one or more selected from the group consisting of polyaspartic acid ester F420™, polyaspartic acid ester F520™, polyaspartic acid ester F530™, polyaspartic acid ester F540™, polyaspartic acid ester F2850™ and polyaspartic acid ester F524™.

In particular, a structural formula of the polyaspartic acid ester F420™ is

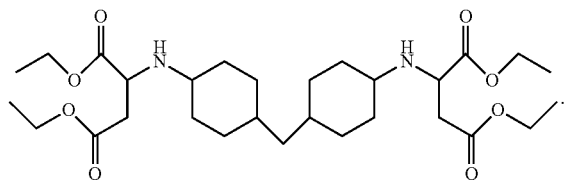 [SMILES: CCOC(=O)CC(NC1CCC(CC2CCC(NC(CC(=O)OCC)C(=O)OCC)CC2)CC1)C(=O)OCC]

A structural formula of the polyaspartic acid ester F520™ is

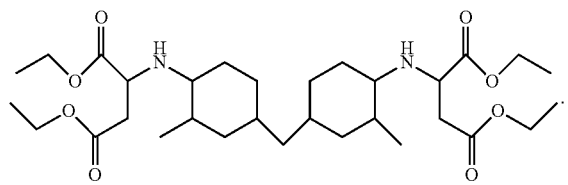 [SMILES: CCOC(=O)CC(NC1CCC(CC2CCC(NC(CC(=O)OCC)C(=O)OCC)C(C)C2)CC1C)C(=O)OCC]

A structural formula of the polyaspartic acid ester F530™ is

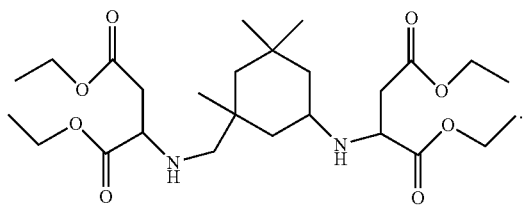 [SMILES: CCOC(=O)CC(NCC1(C)CC(NC(CC(=O)OCC)C(=O)OCC)CC(C)(C)C1)C(=O)OCC]

A structural formula of the polyaspartic acid ester F540™ is

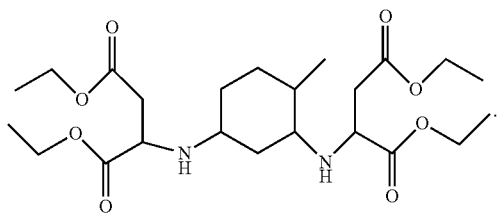 [SMILES: CCOC(=O)CC(NC1CCC(C)C(NC(CC(=O)OCC)C(=O)OCC)C1)C(=O)OCC]

A structural formula of the polyaspartic acid ester F2850™ is

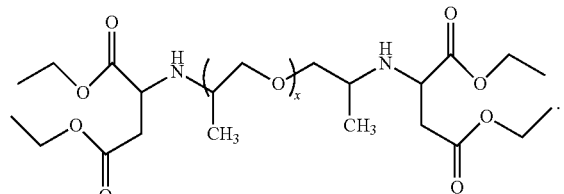

A structural formula of the polyaspartic acid ester F524™ is

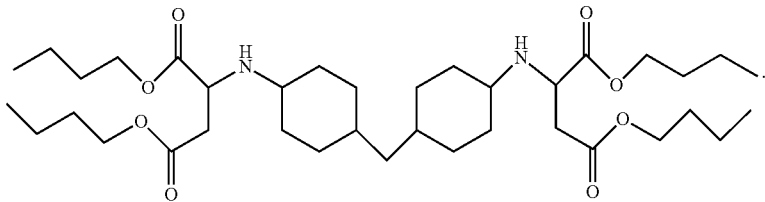 [SMILES: CCCCOC(=O)CC(NC1CCC(CC2CCC(NC(CC(=O)OCCCC)C(=O)OCCCC)CC2)CC1)C(=O)OCCCC]

In an embodiment, the polyaspartic acid ester is polyaspartic acid ester F420™ and/or polyaspartic acid ester F520™.

In the above technical solution, amines for synthesizing the polyaspartic acid ester F420™ and polyaspartic acid ester F520™ are HMDA and DMDC, which do not contain benzene ring structure and have good weather resistance and low reaction speed compared with other amines, so that the coatings have long applicable periods. Bicyclohexyl structure also brings the polyaspartic acid ester with higher hardness.

In an embodiment, the polyaspartic acid ester is polyaspartic acid ester F520™.

In an embodiment, the cardanol resin is cardanol resin NX-202X™ or cardanol resin LITE-2020™.

A structural formula of the cardanol resin NX-202X™ is

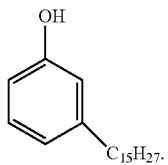

A structural formula of the cardanol resin LITE-2020™ is

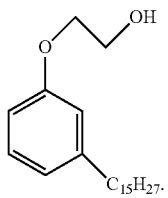

In an embodiment, a molar ratio of polyaspartic acid ester to cardanol resin to catalyst is polyaspartic acid ester: cardanol resin:catalyst=1:0.25:0.002.

It can be known from experimental verification, under this molar ratio, the prepared salt-spray-resistant polyaspartic acid ester has good comprehensive performance. When the prepared salt-spray-resistant polyaspartic acid ester is applied in the polyaspartic acid ester coatings, the polyaspartic acid ester coatings have good application effect.

In a second aspect, the present application provides a salt-spray-resistant polyaspartic acid ester, adopting the following technical solution:

a salt-spray-resistant polyaspartic acid ester prepared by the above preparation method for salt-spray-resistant polyaspartic acid ester.

In the above technical solution, the prepared polyaspartic acid ester has a good salt spray resistance and a good water resistance, low viscosity and long operable time for construction.

In a third aspect, the present application provides a salt-spray-resistant polyaspartic acid ester coating, adopting the following technical solution:

a salt-spray-resistant polyaspartic acid ester coating includes component A and component B, and is prepared by mixing component A and component B and curing for molding at room temperature, in particular, the component A at least includes the salt-spray-resistant polyaspartic acid ester of the above technical solution, and the component B is isocyanate curing agent. In particular, room temperature refers to 25±2° C.

The coating formed by the polyaspartic acid ester coating of the present application has good corrosion resistance and high hardness. After the component A and the component B are mixed, a long curing period is achieved, so that a long operable period for construction is achieved.

In an embodiment, the component A further includes one or more selected from the group consisting of a dispersing agent, an anti-settling agent, a defoaming agent, barium sulfate, titanium dioxide, zinc phosphate, a leveling agent and butyl acetate.

In an embodiment, a mass ratio of the component A to the component B is calculated in accordance with secondary amino equivalent in the component A: isocyanate group equivalent in the component B=1:1.05.

In the above technical solution, excessive addition of isocyanate curing agent can ensure adequate reaction of the polyaspartic acid ester.

In an embodiment, the isocyanate curing agent is HDI (hexamethylene diisocyanate) trimer.

In summary, the present application can achieve at least one of the following beneficial technical effects:

1. in the present application, the polyaspartic acid ester is modified by the cardanol resin. The aromatic ring in the molecule of the cardanol resin can provide good chemical resistance and rigidity, the hydroxyl group can provide reactivity, so that an esterification or a transesterification reaction can be conducted. The aliphatic side chain can provide good water resistance, toughness, low viscosity and long construction period. Therefore, combining with the crosslinking catalytic action of the catalyst, modifying the polyaspartic acid ester by the cardanol resin can improve the water resistance and the salt spray resistance of the polyaspartic acid ester, so that the prepared polyaspartic acid ester has good corrosion resistance, low viscosity, long construction period and can be constructed without solvents;

2. the prepared polyaspartic acid ester in the present application has good water resistance and good salt spray resistance, low viscosity and long operable period for construction; and 3. the coating formed by the polyaspartic acid ester coating of the present application has good corrosion resistance and high hardness. After the component A and the component B are mixed, a long curing period is achieved, so that a long operable period for construction is achieved.

DETAILED DESCRIPTION

Polyaspartic acid ester is an environmental friendly coating that has a high solid content, a small molecular weight and a low viscosity, and being constructed without solvents, so it is widely used in fields such as waterproofing, flooring, and anti-corrosion. However, since the polyaspartic acid ester has a small molecular weight and a high content of ester bonds in molecules, polyaspartic acid ester coatings prepared by reacting the polyaspartic acid ester with the isocyanate have poor hydrophobicity and water resistance. Since the salt spray is supersaturated water mist, the paint film is easy to be permeated and corroded by the salt spray due to poor hydrophobicity and water resistance of the polyaspartic acid ester. Therefore, polyaspartic acid ester coatings are difficult to be applied in heavy anti-corrosion fields such as construction machinery anti-corrosion, ship anti-corrosion, etc. due to poor salt spray resistance of the polyaspartic acid ester coatings.

Based on the above defects, after extensive research, it can be found that, the modified polyaspartic acid ester obtained by esterification reaction between cardanol and polyaspartic acid ester has good water resistance and salt spray resistance. When the modified polyaspartic acid ester is applied on coatings, a good corrosion resistance is obtained. The present application is obtained based on the above research.

In order to conveniently understand the technical solution of the present application, the present application will be further described in detail below in combination with the following tables and examples, however, which do not limit the protection scope of the present application.

EXAMPLES

Example 1

514 g (1 mol) of polyaspartic acid ester (product model: F530™, commercially available from Shenzhen Feiyang Protech New Materials Co., Ltd), 30.2 g (0.1 mol) of cardanol resin (product model: NX2024™, commercially available from Cardolite), 0.3 g (0.001 mol) of tetraisopropyl titanate were added into 1 L of four-necked flask, heated to 100° C. under stirring, and conducted vacuum distillation for reaction under relative vacuum degree of −0.095 MPa for 2 h to obtain a salt-spray-resistant polyaspartic acid ester.

The obtained salt-spray-resistant polyaspartic acid ester had a secondary amino equivalent of 263.5 and a viscosity of 1800 mPa·s (25° C.).

Example 2

582 g (1 mol) of polyaspartic acid ester (product model: F520™, commercially available from Shenzhen Feiyang Protech New Materials Co., Ltd), 68.8 g (0.2 mol) of cardanol resin (product model: LITE-2020™, commercially available from Cardolite), 0.74 g (0.003 mol) of dibutyltin oxide were added into 1 L of four-necked flask, heated to 120° C. under stirring, and conducted vacuum distillation for reaction under relative vacuum degree of −0.095 MPa for 3 h to obtain a salt-spray-resistant polyaspartic acid ester.

The obtained salt-spray-resistant polyaspartic acid ester had a secondary amino equivalent of 321 and a viscosity of 3350 mPa·s (25° C.).

Example 3

514 g (1 mol) of polyaspartic acid ester (product model: F530™, commercially available from Shenzhen Feiyang Protech New Materials Co., Ltd), 75.5 g (0.25 mol) of cardanol resin (product model: NX-2024™, commercially available from Cardolite), 0.58 g (0.002 mol) of tetraisopropyl titanate were added into 1 L of four-necked flask, heated to 100° C. under stirring, and conducted vacuum distillation for reaction under relative vacuum degree of −0.095 MPa for 5 h to obtain a salt-spray-resistant polyaspartic acid ester.

The obtained salt-spray-resistant polyaspartic acid ester had a secondary amino equivalent of 309 and a viscosity of 3200 mPa·s (25° C.).

Example 4

666 g (1 mol) of polyaspartic acid ester (product model: F524™, commercially available from Shenzhen Feiyang Protech New Materials Co., Ltd), 103.2 g (0.3 mol) of cardanol resin (product model: NX-2024™, commercially available from Cardolite), 0.9 g (0.003 mol) of tetraisopropyl titanate were added into 1 L of four-necked flask, heated to 125° C. under stirring, and conducted vacuum distillation reaction under relative vacuum degree of −0.095 MPa for 4 h to obtain a salt-spray-resistant polyaspartic acid ester.

The obtained salt-spray-resistant polyaspartic acid ester had a secondary amino equivalent of 350 and a viscosity of 4100 mPa·s (25° C.).

COMPARATIVE EXAMPLES

Comparative Example 1

The polyaspartic acid ester with a product model of F420™ (commercially available from Shenzhen Feiyang Protech New Materials Co., Ltd) had a secondary amino equivalent of 277 and a viscosity of 1000 mPa·s (25° C.).

Comparative Example 2

The polyaspartic acid ester with a product model of F520™ (commercially available from Shenzhen Feiyang Protech New Materials Co., Ltd) had a secondary amino equivalent of 291 and a viscosity of 1300 mPa·s (25° C.).

Comparative Example 3

Comparative example 3 was same as Example 2 expect that, an additive amount of the cardanol resin (product model: LITE-2020™, commercially available from Cardolite) was 22.9 g (0.06 mol).

Comparative Example 4

Comparative example 4 was same as Example 2 expect that, an additive amount of the cardanol resin (product model: LITE-2020™, commercially available from Cardolite) was 133.5 g (0.35 mol).

TABLE 1

Viscosities of the polyaspartic acid ester in Examples 1-4 and Comparative examples 1-4

| Examples | Viscosity/mPa · s (25° C.) |
| --- | --- |
| Example 1 | 1800 |
| Example 2 | 3350 |
| Example 3 | 3200 |
| Example 4 | 4100 |
| Comparative example 1 | 1000 |
| Comparative example 2 | 1300 |
| Comparative example 3 | 1750 |
| Comparative example 4 | 4670 |

The polyaspartic acid ester coatings were prepared by the above prepared polyaspartic acid ester in Examples 1-4 and Comparative examples 1-4 in accordance with the following components calculated in parts by weight, shown as table 2.

TABLE 2

The components of the polyaspartic acid ester coatings

| | Components | Parts by weight |
|---|---|---|
| Component A | polyaspartic acid ester | 25 |
| | Dispersing agent | 1 |
| | Anti-settling agent | 0.4 |
| | Defoaming agent | 0.4 |
| | Barium sulfate | 15 |
| | Titanium dioxide | 16 |
| | Zinc phosphate | 27 |
| | Leveling agent | 0.1 |
| | Butyl acetate | 15.1 |
| Component B | Isocyanate curing agent | 100 |

In particular, the dispersing agent is DISPERBYK-16 commercially available from BYK-Chemie GmbH, the anti-settling agent is fumed silica HDK0®H15 commercially available from Wacker Germany, the defoaming agent is BYK-1790 commercially available from BYK-Chemie GmbH, the leveling agent is EFKA-3600 commercially available from BASF, barium sulfate has a particle size of 2200 mesh, titanium dioxide is NTR606 commercially available from Ningbo Xinfu titanium dioxide CO., LTD, zinc phosphate is Nubirox-213 commercially available from Nubiola, Spain, and the isocyanate curing agent is HT-100 (HDI trimer, the mass fraction of isocyanate (—NCO) is 21.7%) commercially available from Wanhua Chemical Group Co., Ltd.

A preparation method of the polyaspartic acid ester coatings is as follows:

the polyaspartic acid ester, dispersing agent, anti-settling agent, barium sulfate, zinc phosphate, titanium dioxide were added into a reaction kettle, dispersed at a rotary speed of 3000 rpm for 30 min until the fineness of coating was less than 30 μm. The defoaming agent, the leveling agent, and butyl acetate were added and stirred at a rotary speed of 1000 rpm for 10 min to obtain component A. The component A and component B were mixed in accordance with the secondary amino equivalent:isocyanate group equivalent=1:1.05, under uniform stirring to obtain the polyaspartic acid ester coating.

Performance Test

The polyaspartic acid ester coatings prepared by the polyaspartic acid ester in Examples 1-4 and Comparative examples 1-4 were conducted the following performance tests:

applicable period: the test method was conducted in accordance with GB/T31416-2015;

hard drying time: the test method was conducted in accordance with GB/T1728-1989;

adhesive force: the test method was conducted in accordance with GB/T9286-1998;

hardness: the test method was conducted in accordance with GB/T6739-2006; and salt spray resistance: the test method was conducted in accordance with GB/T1771-2007.

Test data were shown in table 3.

TABLE 3

Performance data of the coatings prepared by polyaspartic acid ester in Examples 1-4 and Comparative examples 1-4

| | Mass ratio of component A and component B | Applicable period/min | Hard drying time/h | Adhesive force (100-grid test) | Hardness | Salt spray resistance/h |
|---|---|---|---|---|---|---|
| Example 1 | 1:0.19 | 40 | 1.5 | 0 grade | 2H | 900 |
| Example 2 | 1:0.16 | 240 | 8 | 0 grade | 2H | 1120 |
| Example 3 | 1:0.165 | 40 | 1.5 | 0 grade | 2H | 1000 |
| Example 4 | 1:0.145 | 60 | 2 | 0 grade | H | 1250 |
| Comparative example 1 | 1:0.18 | 30 | 1 | 0 grade | 2H | 520 |
| Comparative example 2 | 1:0.17 | 240 | 8 | 0 grade | 2H | 600 |
| Comparative example 3 | 1:0.17 | 240 | 8 | 0 grade | 2H | 610 |
| Comparative example 4 | 1:0.145 | 240 | 10 | 0 grade | HB | 800 |

Comparing the test data of Examples 1-4 and Comparative examples 1-2 in table 3, it can be seen that, modifying the polyaspartic acid ester by the cardanol resin can improve its salt spray resistance. The salt spray resistances of the prepared polyaspartic acid ester coatings are improved with the increasing of additive amount of the cardanol resin. In particular, the prepared polyaspartic acid ester coating in Example 2 has a too long hard drying time, which has a certain affect to the construction. The prepared polyaspartic acid ester coating in Example 4 has better salt spray resistance, but its hardness slightly decreases. Therefore, considering applicable period, hard drying time, hardness and salt spray resistance, the polyaspartic acid ester coating prepared in Example 3 has better performances.

Comparing the test data of Examples 1-4 and Comparative examples 3-4 in table 3, it can be seen that, when the molar ratio of cardanol resin to polyaspartic acid ester is less than 0.1:1, the improvement of the salt spray resistance of the prepared polyaspartic acid ester coating is not significant. However, when the molar ratio of cardanol resin to polyaspartic acid ester is greater than 0.3:1, the hardness of the prepared polyaspartic acid ester coating is significantly reduced, which cannot meet the application standard, and the salt spray resistance of the prepared polyaspartic acid ester coating is reduced. The reason is that, the crosslinking density of the polyaspartic acid ester and the curing agent is reduced in subsequent application due to the large amount of the additive amount of cardanol resin and long branched chains, thereby causing the decrease of the salt spray resistance of the coating.

The above are the preferred embodiments of the present application, which are not intended to limit the protection scope of the present application. Therefore, all equivalent changes made according to the structure, shape and principle of the present application should be covered within the protection scope of the present application.

What is claimed is:

1. A preparation method for a salt-spray-resistant polyaspartic acid ester comprising mixing polyaspartic acid ester, cardanol resin and a catalyst together for transesterification reaction, and controlling a temperature at 100-130° C. and a relative vacuum degree at −0.095 MPa--0.1 MPa, and stirring for reaction for 2-5 h to obtain the salt-spray-resistant polyaspartic acid ester;

wherein a molar ratio of the polyaspartic acid ester to the cardanol resin to the catalyst 1:0.1-0.3:0.001-0.003, and the catalyst is tetraisopropyl titanate or dibutyltin oxide; and a structural formula of the cardanol resin is

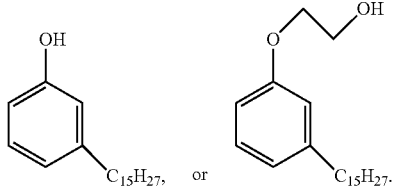

2. The preparation method for salt-spray-resistant polyaspartic acid ester according to claim 1, wherein a structural formula of the polyaspartic acid ester is

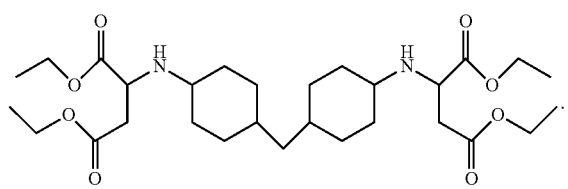 [SMILES: CCOC(=O)CC(NC1CCC(CC2CCC(NC(CC(=O)OCC)C(=O)OCC)CC2)CC1)C(=O)OCC]

3. The preparation method for salt-spray-resistant polyaspartic acid ester according to claim 1, wherein a structural formula of the polyaspartic acid ester is

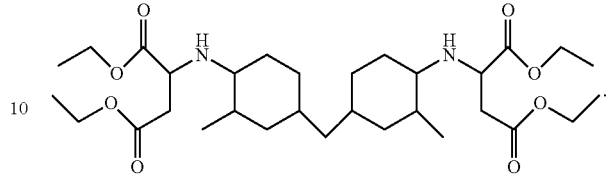

4. The preparation method for salt-spray-resistant polyaspartic acid ester according to claim 1, wherein a structural formula of the polyaspartic acid ester is

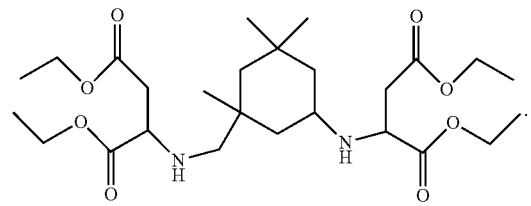 [SMILES: CCOC(=O)CC(NCC1(C)CC(NC(CC(=O)OCC)C(=O)OCC)CC(C)(C)C1)C(=O)OCC]

5. The preparation method for salt-spray-resistant polyaspartic acid ester according to claim 1, wherein a structural formula of the polyaspartic acid ester is

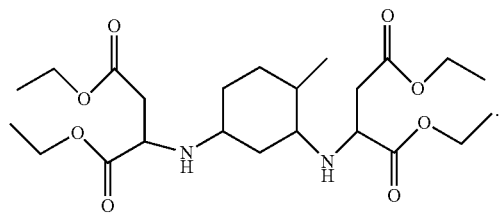 [SMILES: CCOC(=O)CC(NC1CCC(C)C(NC(CC(=O)OCC)C(=O)OCC)C1)C(=O)OCC]

6. The preparation method for salt-spray-resistant polyaspartic acid ester according to claim 1, wherein a structural formula of the polyaspartic acid ester is

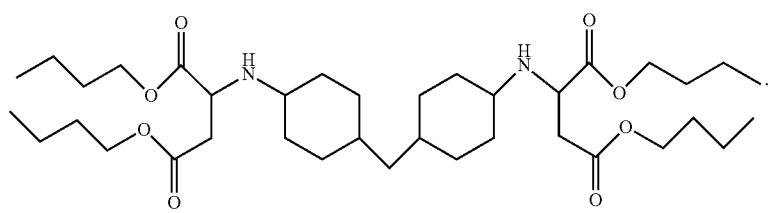 [SMILES: CCCCOC(=O)CC(NC1CCC(CC2CCC(NC(CC(=O)OCCCC)C(=O)OCCCC)CC2)CC1)C(=O)OCCCC]

7. The preparation method for salt-spray-resistant polyaspartic acid ester according to claim 1, wherein the molar ratio of the polyaspartic acid ester to the cardanol resin to the catalyst is 1:0.25:0.002.

* * * * *